US010255050B2

(12) United States Patent
Martinez et al.

(10) Patent No.: US 10,255,050 B2
(45) Date of Patent: Apr. 9, 2019

(54) METHOD FOR CODE DISAMBIGUATION

(71) Applicant: BULL SAS, Les Clayes Sous Bois (FR)

(72) Inventors: Patrice Martinez, Genoble (FR); Gaël Lalire, Grenoble (FR); Landry Stéphane Zeng Eyindanga, Grenoble (FR)

(*) Notice: Subject to any disclaimer, the term of this patent is extended or adjusted under 35 U.S.C. 154(b) by 162 days.

(21) Appl. No.: 15/113,987

(22) PCT Filed: Jan. 27, 2015

(86) PCT No.: PCT/FR2015/050183
§ 371 (c)(1),
(2) Date: Jul. 25, 2016

(87) PCT Pub. No.: WO2015/110771
PCT Pub. Date: Jul. 30, 2015

(65) Prior Publication Data
US 2016/0350092 A1    Dec. 1, 2016

(30) Foreign Application Priority Data
Jan. 27, 2014    (FR) ...................................... 14 50647

(51) Int. Cl.
| G06F 9/44 | (2018.01) |
| G06F 8/54 | (2018.01) |
| G06F 8/72 | (2018.01) |
| G06F 8/40 | (2018.01) |

(52) U.S. Cl.
CPC ................. *G06F 8/54* (2013.01); *G06F 8/40* (2013.01); *G06F 8/72* (2013.01)

(58) Field of Classification Search
CPC ...... G06F 8/443; G06F 8/433; G06F 9/45516; G06F 11/3612; G06F 9/3838; G06F 8/72
See application file for complete search history.

(56) References Cited

U.S. PATENT DOCUMENTS

| 2008/0134159 A1* | 6/2008 | Guo ........................ G06F 8/433 |
| | | 717/154 |
| 2014/0372994 A1* | 12/2014 | Chheda ................. G06F 8/4432 |
| | | 717/146 |

OTHER PUBLICATIONS

Donald Hindle, Acquiring disambiguation rules from text, 1989, ACL '89 Proceeding of the 27th annual meeting on Association for Computational Linguistics, pp. 118-125, retrieved online on Nov. 15, 2018. Retrieved from the Internet: <URL: http://delivery.acm.org/10.1145/990000/981638/p118-hindle.pdf?>. (Year: 1989).*
International Search Report as issued in International Patent Application No. PCT/FR2015/050183, dated Mar. 30, 2015.

(Continued)

*Primary Examiner* — Hanh Thi-Minh Bui
(74) *Attorney, Agent, or Firm* — Pillsbury Winthrop Shaw Pittman LLP

(57) ABSTRACT

A method for disambiguating an executable code file including a symbol table, includes reading a disambiguation configuration including at least one symbol-renaming instruction; renaming symbols from a symbol table according to at least one symbol-renaming instruction of the disambiguation configuration; and saving the file with the code disambiguated according to the disambiguation configuration.

5 Claims, 1 Drawing Sheet

(56) References Cited

OTHER PUBLICATIONS

"Emile "iMil" Heitor's home," Blog Archive, Duplication de symbols, la bonne methode, Dec. 2008, XP055150325, Retrieved from the Internet: <http://imil.net/wp/2008/12/06/duplication-de-symboles-la-bonne-methode/> [retrieved on Oct. 31, 2014].

"Objcopy—GNU Binary Utilities," Dec. 2013, XP055150329, Retrieved from the Internet: <http://web.archive.org/web/20131220023136/http://sourceware.org/binutils/docs/binutils/objcopy.html> [retrieved on Oct. 31, 2014].

"NM—GNU Binary Utilities," Aug. 2013, XP055150331, Retrieved from the Internet: <http://web.archive.org/web/20130805024007/http://sourceware.org/binutils/docs/binutils/nm.html> [retrieved on Oct. 31, 2014].

\* cited by examiner

METHOD FOR CODE DISAMBIGUATION

CROSS REFERENCE TO RELATED APPLICATIONS

This application is the U.S. National Stage of PCT/FR2015/050183, filed Jan. 27, 2015, which in turn claims priority to French Patent Application No. 1450647 filed Jan. 27, 2014, the entire contents of all applications are incorporated herein by reference in their entireties.

TECHNICAL DOMAIN

The invention relates to a method for disambiguating code and particularly executable code.

Executable code for the purposes of this application refers to any sequence of bytes that can be loaded for execution by an operating system. This relates particular; but not exclusively, to ELF (Executable in Linkable Format) and PE (Portable Executable) formats. In general, it also relates to all so-called executable files and so-called library files that form executable code.

STATE OF THE ART

Some applications require that a plurality of libraries be put in parallel. Each library exports functions that can be used by other libraries or functions that reference it. It is then said that these are libraries are dependent on the library. Each exported function has a name that identifies it.

Problems arise in at least the following cases:

Two different libraries export a function with the same name,

A file E depends on two libraries, libA that exports a function fa and libB that exports a function fb. Function fa calls function fc of a version v1 of a library libC. Therefore libA depends on a version v1 of libC. Function fb calls a function fc of a version v2 of libC. Therefore libB depends on a version v2 of libC. In this case, when fa or fb is called during execution, there is ambiguity about which version of function fc should be loaded. In this case the program fails and stops with an error message, or the program behaviour is undefined.

When such a problem is detected in the state of the art, the source code will be "refactored" if possible. This means that another development cycle will be performed to solve naming ambiguities. In the example mentioned, the source code of one of the versions of library libC will have to be changed to rename function fc. This requires that:

the source code for the library must be available, although this is rarely the case, another specific version of the library has to be created, therefore management of the development of libC and E is made more complex.

A new refactorisation is also an expensive operation because it involves another validation of all impacted code, in other words all unit and/or functional tests have to be repeated to check that there is no impact on the behaviour of the application using the modified code.

Therefore this involves a large work load that is difficult to automate.

PRESENTATION OF THE INVENTION

The invention is intended to overcome all or some of the disadvantages of prior art identified above, and particular to suggest means of adapting versions of a library without needing to access or modify its source code.

The invention uses a configuration file that specifies symbol renaming instructions. An instruction is used to select one or several symbols in a symbols table and to specify a renaming rule for the selected symbols. For example, symbols are selected as a function of the nature (exported or imported) and/or as a function of their name. In the same way, the configuration file contains dependency renaming instructions.

One aspect of the invention to achieve this purpose is related to a method of disambiguating a file of executable code comprising a symbols table, characterised in that it includes the following steps:

read a disambiguation configuration comprising at least one symbol renaming instruction, rename symbols in a symbols table according to at least one symbol renaming instruction in the disambiguation configuration, save the disambiguated code file according to the disambiguation configuration Apart from the main characteristics that were mentioned in the above paragraph, the method/device according to the invention can have one or several additional characteristics among the following, considered individually or in any possible technical combination the executable code file contains a dependencies table, the method including the following steps:

read a disambiguation configuration comprising at least one dependency renaming instruction, rename dependencies in the dependency table according to at least one dependency renaming instruction in the disambiguation configuration;

a renaming instruction comprises at least:

one symbol or dependency selection criterion, one name branch rule dependent on at least the symbol name;

a symbol selection criterion comprises a symbol nature code according to whether an exported symbol or an imported symbol has to be selected;

a selection criterion is a regular expression type mask applied to the name of a symbol or a dependency;

a branch rule takes account of version information of the executable code file to be produced.

The invention also relates to a digital storage device storing a program that can be executed by a machine and composed of instructions that execute the method according to a combination of the previously mentioned characteristics.

BRIEF DESCRIPTION OF THE FIGURES

Other characteristics and advantages of the invention will become clear after reading the description given below with reference to the appended figures that illustrate.

Identical or similar elements are assigned the same reference marks on all figures, to make them easier to understand.

The invention will be better understood after reading the following description and studying the accompanying fig-

DETAILED DESCRIPTION OF THE INVENTION

Figure 1:
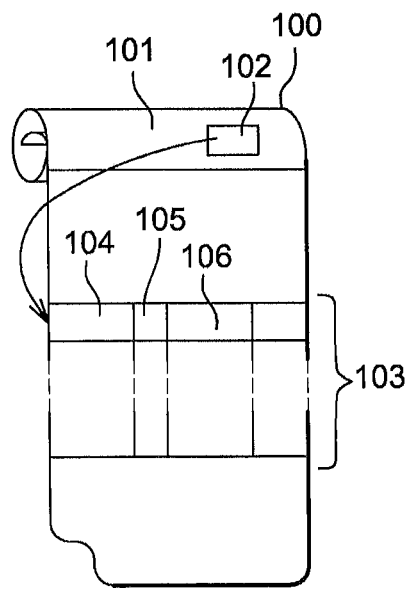
FIG. 1, a diagrammatic view of an executable file.

FIG. 1 shows a diagrammatic view of the structure 1 of an executable file. FIG. 1 show an executable file. Such a file is usually saved on storage means. Such a file is usually loaded into a working memory so that a microprocessor can interpret its contents. In this case, the term interpretation does not imply anything about the nature of the file content. It is binary code that can be loaded into memory.

The executable file 101 comprises a header zone 101. The header describes the file structure. The header 101 contains several fields including offsets of different sections of the executable file 101. In particular, the first field 102 in the header 101 gives the offset of a symbols table section 103. An offset is conventionally a distance in bytes from the beginning of the file or the end of the header.

A symbol is a reference to a code or data area in an executable file. A symbol is a means of describing an area to be read or written.

The symbols table section 103 is usually structured as a table, each row of the table corresponding to one symbol. A row comprises at least three columns:
 a symbol name column 104.
 a symbol type column 105.
 a symbol offset column 106.

The symbol name is used as an entry to the symbols table, in other words as an identifier of the symbol when the executable file 101 is executed or when the executable file 101 is used for link editing in an executable code production process.

The type specifies whether the symbol is imported or exported. The symbol is exported if it can be used by an executable file other than the file that contains the symbols table. The symbol is imported if the corresponding code or data zone has to be fetched from an executable file other the file that contains the symbols table.

The symbol offset column 106 contains an offset if the symbol is exported. If the symbol is imported, the offset column comprises:
 either an indirection to a row in the dependencies table
 or a name of an executable file containing the symbol code or data to be imported. In this case, the symbols table is also a dependencies table.

In a simplified manner, a dependencies table is an indexed list of executable file names. Knowledge of the dependencies table offset, for example through a header field 101, and knowledge of an index through the symbols table offset column 106, provides access to the name of the executable element.

Figure 2:
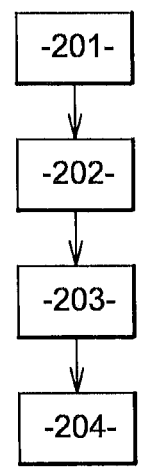
FIG. 2, an illustration of steps in the method according to the invention.

FIG. 2 shows a step 201 to read a disambiguation configuration. A disambiguation configuration is saved in a disambiguation file. All or some of the parameters in the disambiguation configuration file can be supplied in a command line.

Figure 3:
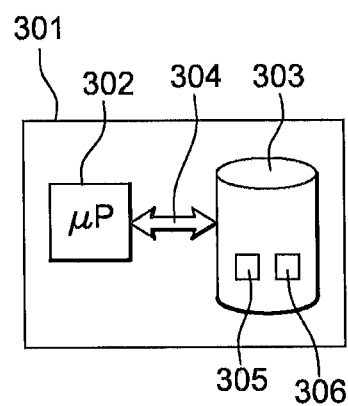
FIG. 3 is a processing computer for implementing the method according to an embodiment of the invention.

The method according to the invention is implemented by a processing computer 301 (shown in FIG. 3) comprising a microprocessor 302 connected to storage means 303 through a bus 304. Therefore the method according to the invention corresponds to instruction codes saved on storage means 303 and designated by a file name. Therefore the method according to the invention is invoked by the corresponding file name. For example, this name is entered in a command window, also called a console. This name can be followed by one or several parameters.

When an action is done by a microprocessor or a computer, the action is performed by the microprocessor controlled by instruction codes loaded into a working memory.

A disambiguation configuration file comprises:
 An identifier of a file to be processed, and a new name for the file created during the processing
 One or several renaming instructions
 None, one or several renaming parameters A renaming instruction applies either to a symbol or to a dependency. Thus, a renaming instruction has the following structure:
 A designation code depending on whether a symbol or a dependency is to be renamed,
 A selection mask interpreted as a function of the designation code
 A branch code for a new name Designation codes are arbitrary values depending on whether it is required to rename a symbol or a dependency, for example:
 1 for a symbol,
 2 for a dependency.

A mask may for example comply with one syntax among the following syntaxes, for all renaming functions:
 A complete symbol name, in this case a symbol for which the name corresponds exactly is sought,
 An SQL type mask with the following joker characters:
  _ for any one and only one character,
  % for any character in any number of zeroes, with no limit.
 A file selector type mask with the following joker characters:
  ? for any one and only one character,
  * for any character in any number of zeroes, with no limit:
 A regular expression.

This list of example syntaxes is not limiting.

The case of the regular expression is interesting because it can be used to capture parts of a string that can be used to construct a new name for the symbol.

If it is required to use several selection mask syntaxes in the same disambiguation configuration file, then information has to be added to the structure of the renaming instruction, this added information being code that specifies how the mask should be interpreted.

For example, a branch rule may be:
 A string compatible with the C language printf instruction, the other printf instruction parameters being (in a predetermined order) the symbol or dependency name, renaming parameters. A C language instruction is mentioned, but another language such as C# could also be used and in this case the String/Format instruction would be used.
 A replacement string in the context of using a regular expression. In this case, the example given is the preg_replace function of the PHP language.

In step 201; the computer 301 loads a disambiguation configuration file. The computer 301 uses this file to know:
 A file 306 to be processed, this is a file stored on the storage means 303 of the processing computer 301,
 The name of the file to be produced,
 Renaming parameters,
 A list of renaming instructions The processing computer goes on from step 201 to a step 302 to bad the symbols list. The case in which the symbols table is also a dependencies table is considered, to simplify the description. In the loading step 202, the computer 301 accesses the symbols table of the file 306 to be processed through the header of this file.

Once the symbols table has been loaded, the computer 301 performs a step 203 to analyse each symbol to determine if one of the renaming instructions applies to the symbol. The analysis proceeds as follows:

if there is a renaming rule for which the designation code is equal to 1 and for which the selection mask corresponds to the symbol name,
        replace the symbol name by the result of application of the branch rule corresponding to the rule
    end if
    if the symbol is exported
        if there is a renaming rule for which the designation code is equal to 2 and for which the selection mask corresponds to the symbol dependency
            replace the dependency name by the result of application of
            the branch rule corresponding to the rule
        end if
    end if These pseudo-instructions are executed for each symbol in the symbols table, and if applicable for each dependency in the dependencies table.

The computer 301 goes on from step 203 in which each symbol is analysed, to a step 204 to save the modified file according to the disambiguation configuration loaded in step 201 to load the configuration in a file for which the name was also loaded in step 201.

In one variant of the invention, symbols to be processed are selected depending on whether they are imported or exported. In this case, the structure of a renaming instruction contains a code specifying whether it applies to exported symbols, imported symbols, or to both.

One example considers a branch instruction of the following type:

'{0}v{1}'

This means for example that the new symbol name will be the old name+v+first renaming parameter. The first renaming parameter supplied in the disambiguation configuration file may for example by a version number of the file being processed.

In one integrated variant of the invention, only a single renaming instruction is used for all exported symbols. This rule is to rename all exported symbols, taking account of the version of the processed file. This version is obtained as follows depending on the users choice, without being limiting.

By a command line parameter
    By a configuration file
    By analysing the header of the processed file
    By analysing the name of the processed file that is then of the Filename.version.extension type.

In this integrated variant, the file resulting from the processing is a file named according to a version number. For example, this name is Filename.version.extension, in which:

Filename is the name of the file to be processed,
    extension is the extension of the file to be processed, if there is one,
    version is the value of the version parameter If this name is the same as the name of the file to be processed, then either the file resulting from the processing replaces the original file, or the file resulting from the processing is saved in another location, in other words in another directory.

In the integration version, renaming instructions can be integrated into the executable code corresponding to the invention. In this case they are loaded at the same time as the executable code corresponding to the invention.

Thus, considering a file E that imports;
    a function fa from a file LibA that itself imports an add function from a version 1 of a file libC
    a function fb from a file LibB that itself imports an add function from a version 2 of a file libC The following disambiguation operations are performed:
    LibC to LibC.v1, renaming the exported symbols, coherently postfixing them with v1, or _v1 an equivalent character string taking account of at least the version of the file resulting from the processing,
    LibC to LibC.v2, renaming the exported symbols, coherently postfixing them with v2, or _v2 or an equivalent character string taking account of at least the version of the file resulting from the processing,
    LibA to LibA.v1, renaming the symbols imported from LibC, coherently postfixing them with the renaming done to obtain LibC.v1 and renaming the dependence on LibC as a dependence on LibC.v1,
    LibB to LibB.v1, renaming the symbols imported from LibC, coherently postfixing them with the renaming done to obtain LibC.v2 and renaming the dependence on LibC as a dependence on LibC.v2,
    E to E, renaming:
        The LibA dependency as LibA.v1
        The LibB dependency as LibB.v1

In the illustrative example given above, the fact that the names of LibA and LibB are changed and therefore that E is processed, is optional. It is described to help illustrate the invention.

Thus, as seen from file E, ambiguities related to calls to the "add" function have been removed. Therefore the objectives of the invention have been achieved.

We have described a digital storage device for the storage of a program composed of instructions for performing the method according to the invention that can be executed by a machine as being a hard disk, but obviously it could be any other removable or non-removable support. For example, it could be a USB key, a CD, DVD or a "BlueRay Disc", This list is not limiting.

The invention claimed is:

1. A method of disambiguating a file of executable code comprising a symbols table, the method comprising:
    reading a disambiguation configuration comprising at least one renaming instruction;
    renaming symbols in the symbols table according to one or more of the at least one renaming instruction, wherein at least one of the at least one renaming instruction comprises:
    a criterion for selecting a symbol or dependency and
    a name branch rule dependent on at least a name of a symbol; and
    saving the disambiguated code file according to the disambiguation configuration, wherein the executable code file comprises a dependencies table, the method comprising:
    reading a disambiguation configuration comprising at least one dependency renaming instruction; and
    renaming dependencies in the dependencies table according to one or more of the at least one dependency renaming instruction.

2. The disambiguation method according to claim 1, wherein a symbol selection criterion comprises a symbol nature code according to whether an exported symbol or an imported symbol has to be selected.

3. The disambiguation method according to claim 1, wherein the criterion is a regular expression type mask applied to a name of a symbol or dependency.

4. The disambiguation method according to claim 1, wherein the name branch rule takes account of version information of the executable code file to be produced.

5. A non-transitory digital storage device storing a program that is executable by a machine and composed of instructions that execute the method according to claim 1.

* * * * *

UNITED STATES PATENT AND TRADEMARK OFFICE
CERTIFICATE OF CORRECTION

PATENT NO. : 10,255,050 B2  
APPLICATION NO. : 15/113987  
DATED : April 9, 2019  
INVENTOR(S) : Patrice Martinez et al.

Page 1 of 1

It is certified that error appears in the above-identified patent and that said Letters Patent is hereby corrected as shown below:

On the Title Page

Item (72) Inventors:

Please correct the first inventor's residence city as follows:  
Patrice Martinez, Grenoble (FR)

Please correct the second inventor's name as follows:  
Gaël Lalire

Signed and Sealed this  
Twenty-eighth Day of May, 2019

Andrei Iancu  
*Director of the United States Patent and Trademark Office*